United States Patent
Wang et al.

(10) Patent No.: US 12,192,900 B2
(45) Date of Patent: *Jan. 7, 2025

(54) PDCCH BLIND DETECTION METHOD, TERMINAL AND NETWORK SIDE DEVICE

(71) Applicant: DATANG MOBILE COMMUNICATIONS EQUIPMENT CO., LTD., Beijing (CN)

(72) Inventors: Jiaqing Wang, Beijing (CN); Deshan Miao, Beijing (CN); Di Zhang, Beijing (CN); Fangchen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 220 days.

This patent is subject to a terminal disclaimer.

(21) Appl. No.: 17/879,754

(22) Filed: Aug. 2, 2022

(65) Prior Publication Data

US 2022/0377669 A1    Nov. 24, 2022

Related U.S. Application Data

(63) Continuation of application No. 15/734,818, filed as application No. PCT/CN2019/088941 on May 29, 2019.

(30) Foreign Application Priority Data

Jun. 4, 2018    (CN) .......................... 201810563484.9

(51) Int. Cl.
*H04W 52/02* (2009.01)
*H04L 1/00* (2006.01)
*H04W 72/23* (2023.01)

(52) U.S. Cl.
CPC ....... *H04W 52/0229* (2013.01); *H04L 1/0038* (2013.01); *H04W 72/23* (2023.01)

(58) Field of Classification Search
CPC .. H04W 52/0229; H04W 72/23; H04L 1/0038
See application file for complete search history.

(56) References Cited

U.S. PATENT DOCUMENTS

| | | | |
|---|---|---|---|
| 2012/0275364 | A1 | 11/2012 | Anderson et al. |
| 2014/0211673 | A1 | 7/2014 | Lu |
| (Continued) | | | |

FOREIGN PATENT DOCUMENTS

| | | | |
|---|---|---|---|
| CN | 102413587 | A | 4/2012 |
| CN | 102487541 | A | 6/2012 |
| (Continued) | | | |

OTHER PUBLICATIONS

International Search Report for PCT/CN2019/088941 issued on Aug. 7, 2019 and its English Translation provided by WIPO.

(Continued)

*Primary Examiner* — Ronald B Abelson
(74) *Attorney, Agent, or Firm* — Ladas & Parry, LLP

(57) ABSTRACT

A PDCCH blind detection method, a terminal and a network side device are provided. The method includes: detecting, by a terminal, an energy saving signal in an energy saving signal window; blindly detecting, by the terminal, the PDCCH within a target time if the energy saving signal is detected, a distance between the target time and a position where the energy saving signal is detected is within a preset time distance range.

20 Claims, 5 Drawing Sheets

(56) References Cited

U.S. PATENT DOCUMENTS

| | | | |
|---|---|---|---|
| 2016/0330689 A1 | 11/2016 | Park et al. | |
| 2019/0260558 A1 | 8/2019 | Wang et al. | |
| 2020/0196242 A1* | 6/2020 | Hoglund | H04W 8/08 |
| 2020/0245303 A1* | 7/2020 | Hwang | H04W 52/0235 |

FOREIGN PATENT DOCUMENTS

| | | |
|---|---|---|
| CN | 108023714 A | 5/2018 |
| KR | 20150067347 A | 6/2015 |
| WO | 2010124444 A | 11/2010 |
| WO | 2011038696 A | 4/2011 |

OTHER PUBLICATIONS

Written Opinion for PCT/CN2019/088941 issued on Aug. 7, 2019, and its English Translation provided by WIPO.

International Preliminary Report on Patentability for PCT/CN2019/088941 issued on Dec. 8, 2020 and its English Translation provided by WIPO.

"On wake-up signal for EFeMTC," 3GPP TSG RAN WG1 Meeting #93, R1-1805979, Busan, Korea, May 21-25, 2018, Agenda Item: 6.2.6.3, Source: Huawei, HiSilicon, all pages.

"DL power consumption reduction for eMTC, " 3GPP TSG RAN WG1 Meeting #93, R1-1806684, Busan, Korea, May 21-25, 2018, Agenda Item: 6.2.6.3, Source: Samsung, all pages.

The Extended European Search Report for European Patent Application 19816099.6 issued Jun. 25, 2021.

"UE Power Evaluation for DRX with Wake-UP Signaling," 3GPP TSG-RAN WG1 #87, R1-1612068, Nov. 14-18, 2016 Reno, USA, Agenda Item: 7.1.4.1, Source: Qualcomm Incorporated, all pages.

"NB-IoT UE Power Consumption Reduction in Idle Mode Paging," 3GPP TSG RAN WG1 Meeting #88bis, R1-1705203, Spokane, USA Apr. 3-7, 2017, Agenda Item: 7.2.7.1.1, Source: SONY, all pages.

"Discussion on wake up signal configurations and procedures," 3GPP TSG RAN WG1 Meeting 91, R1-1719878, Reno, USA, Nov. 27-Dec. 1, 2017, all pages.

"Wake Up Signal Configuration for NB-IoT," 3GPP TSG RAN WG1 Meeting #92, R1-1801683, Athens, Greece, Feb. 26-Mar. 2, 2018, all pages.

"Wake-Up Signaling for C-DRX Mode," 3GPP TSG RAN WG2 Nr #99, R2-1709652, Aug. 21-25, 2017, Berlin, German, Agenda Item: 10.3.1.10, Source: Qualcomm Incorporated, Apple, all pages.

First Office Action and search report for Chinese Patent Application 201810563484.9 issued on May 8, 2020, and its English Translation issued by the Global Dossier.

First Office Action for Japanese Patent Application 2020-567950 issued on Feb. 22, 2022, and English translation.

"Updated feature lead summary of Wake-up signal configurations and procedures in NB-IoT," 3GPP TSG RAN WG1 Meeting #93, R1-1807560, Agenda Item: 6.2.7.1.1.2, May 21-25, 2018, Source: Huawei, HiSilicon, all pages.

First Office Action for Korean Patent Application 10-2020-7035401 issued on Jun. 22, 2021 and its English translation provided by the Korean Patent Office.

Office Action for U.S. Appl. No. 15/734,818 issued on Feb. 4, 2022.

* cited by examiner transmitting, by a network side device, an energy saving signal within an energy saving signal window, so that if the terminal has detected the energy saving signal, a PDCCH is blindly detected within a target time — 801
Fig. 8
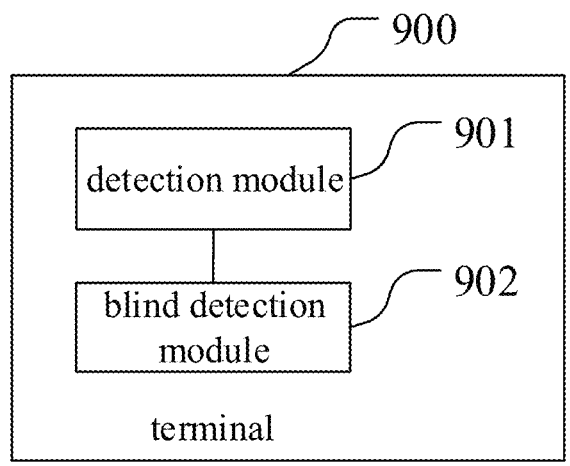
Fig. 9
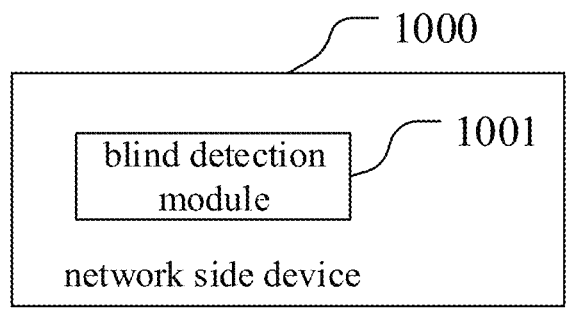
Fig. 10

PDCCH BLIND DETECTION METHOD, TERMINAL AND NETWORK SIDE DEVICE

CROSS-REFERENCE TO RELATED APPLICATIONS

The present application is a continuation of a U.S. patent application Ser. No. 15/734,818 filed on Dec. 3, 2020, which is the U.S. national phase of PCT Application No. PCT/CN2019/088941 filed on May 29, 2019, which claims a priority of the Chinese patent application No. 201810563484.9 filed on Jun. 4, 2018, the disclosures of which are incorporated herein by reference in their entireties.

TECHNICAL FIELD

The present disclosure relates to the technical field of communication technology, in particular to a Physical Downlink Control Channel (PDCCH) blind detection method, a terminal and a network side device.

BACKGROUND

In a 5G New Radio (NR) system, the working state of the UE may include an idle state (RRC_IDLE), an inactive state (RRC_Inactive), and a connected state (RRC_Connected). In addition, at present, power saving is mainly achieved through the Discontinuous Reception (DRX) mechanism. The DRX cycle includes an activation time (On duration) cycle and a DRX sleep time (Opportunity for DRX) cycle. The UE only monitors the PDCCH during the On duration cycle, and does not receive the PDCCH during the Opportunity for DRX cycle, so as to reduce power consumption. However, in the current communication system, the UE needs to blindly detect the PDCCH in each On duration cycle, which leads to relatively high power consumption of the UE.

SUMMARY

The present disclosure is to provide a PDCCH blind detection method, a UE and a network side device, so as to solve the problem of high power consumption of the UE.

In a first aspect, an embodiment of the present disclosure provides a Physical Downlink Control Channel (PDCCH) blind detection method, includes: detecting, by a terminal, an energy saving signal in an energy saving signal window; blindly detecting, by the terminal, the PDCCH within a target time if the energy saving signal is detected, wherein a distance between the target time and a position where the energy saving signal is detected is within a preset time distance range.

Optionally, the target time is an activation time of Discontinuous Reception (DRX); the activation time is configured by a network side device, and the position where the energy saving signal is detected is within the activation time; or the activation time is an activation time after the position where the energy saving signal is detected among a plurality of activation times configured by the network side device.

Optionally, if the terminal is in a connected state, the position where the energy saving signal is detected is within the activation time, or the activation time is the activation time after the position where the energy saving signal is detected; and/or if the terminal is in a disconnected state, the position where the energy saving signal is detected is within the activation time.

Optionally, the energy saving signal window is located before the activation time, and the energy saving signal window includes one or more candidate positions; or the energy saving signal window includes candidate positions located before the activation time, and further includes candidate positions located within the activation time; or the energy saving signal window is within the activation time, and the energy saving signal window includes one or more candidate positions.

Optionally, the terminal uses a low-power receiver to detect the energy saving signal at a candidate position of the energy saving signal; or the terminal adopts a passive receiver to detect the energy saving signal, wherein a position for detecting the energy saving signal at least includes a position where the energy saving signal window is located.

Optionally, time intervals between a plurality of candidate positions included in the energy saving signal window are equal; or the candidate positions in the energy saving signal window are determined according to prior information of an end for transmitting the energy saving signal; or the candidate positions in the energy saving signal window are configured on demand.

Optionally, if the candidate positions in the energy saving signal window are configured on demand, an interval between the candidate position for transmitting the energy saving signal and the PDCCH is 0, or the interval between the candidate position for transmitting the energy saving signal and the PDCCH does not exceed a preset value.

Optionally, the energy saving signal includes a first signal subset and a second signal subset, and the first signal subset is located before the second signal sub set.

Optionally, an interval between a location where the second signal subset is located and the PDCCH is 0, or the interval between the location where the second signal subset is located and the PDCCH does not exceed a preset value.

Optionally, if the energy saving signal is detected, blindly detecting, by the terminal, the PDCCH within the activation time of DRX, includes: if the first signal subset is detected, waking up, by the terminal, a receiver of the terminal; if the second signal subset is detected, blindly detecting, by the terminal, the PDCCH within the activation time of DRX.

Optionally, the terminal obtains configuration information of the energy saving signal window configured by the network side device in a semi-static, static or dynamic manner.

In a second aspect, a PDCCH monitoring method, includes: transmitting, by a network side device, an energy saving signal within an energy saving signal window, so that if the terminal has detected the energy saving signal, a PDCCH is blindly detected within a target time, wherein a distance between the target time and a position where the energy saving signal is detected is within a preset time distance range.

Optionally, the target time is an activation time of DRX; the activation time is configured by the network side device, and the position where the energy saving signal is detected is within the activation time; or the activation time is an activation time after the position where the energy saving signal is detected among a plurality of activation times configured by the network side device.

Optionally, if the terminal is in a connected state, the position where the energy saving signal is detected is within the activation time, or the activation time is the activation time after the position where the energy saving signal is detected; and/or if the terminal is in a disconnected state, the position where the energy saving signal is detected is within the activation time.

Optionally, the energy saving signal window is located before the activation time, and the energy saving signal window includes one or more candidate positions; or the energy saving signal window includes candidate positions located before the activation time, and further includes candidate positions located within the activation time; or the energy saving signal window is within the activation time, and the energy saving signal window includes one or more candidate positions.

Optionally, the network side device uses a low-power transmitter to transmit the energy saving signal.

Optionally, the time intervals between a plurality of candidate positions included in the energy saving signal window are equal; or the candidate positions in the energy saving signal window are determined according to prior information of the network side device; or the candidate positions in the energy saving signal window are configured on demand.

Optionally, if the candidate positions in the energy saving signal window are configured on demand, an interval between the candidate position for transmitting the energy saving signal and the PDCCH is 0, or the interval between the candidate position for transmitting the energy saving signal and the PDCCH does not exceed a preset value.

Optionally, the energy saving signal includes a first signal subset and a second signal subset, and the first signal subset is located before the second signal sub set.

Optionally, an interval between a location where the second signal subset is located and the PDCCH is 0, or the interval between the location where the second signal subset is located and the PDCCH does not exceed a preset value.

Optionally, the network side device configures configuration information of the energy saving signal window for the terminal in a semi-static, static or dynamic manner.

In a third aspect, a terminal, includes: a detection module, configured to detect an energy saving signal in an energy saving signal window; a blind detection module, configured to blindly detect the PDCCH within a target time if the energy saving signal is detected, wherein a distance between the target time and a position where the energy saving signal is detected is within a preset time distance range.

Optionally, the target time is an activation time of DRX; the activation time is configured by a network side device, and the position where the energy saving signal is detected is within the activation time; or the activation time is an activation time after the position where the energy saving signal is detected among a plurality of activation times configured by the network side device.

Optionally, the energy saving signal window is located before the activation time, and the energy saving signal window includes one or more candidate positions; or the energy saving signal window includes candidate positions located before the activation time, and further includes candidate positions located within the activation time; or the energy saving signal window is within the activation time, and the energy saving signal window includes one or more candidate positions.

Optionally, time intervals between a plurality of candidate positions included in the energy saving signal window are equal; or the candidate positions in the energy saving signal window are determined according to prior information of an end for transmitting the energy saving signal; or the candidate positions in the energy saving signal window are configured on demand.

Optionally, the energy saving signal includes a first signal subset and a second signal subset, and the first signal subset is located before the second signal sub set.

In a fourth aspect, a network side device, includes: a transmitting module, configured to transmit an energy saving signal within an energy saving signal window, so that if the terminal has detected the energy saving signal, a PDCCH is blindly detected within a target time, wherein a distance between the target time and a position where the energy saving signal is detected is within a preset time distance range.

Optionally, the target time is an activation time of DRX; the activation time is configured by the network side device, and the position where the energy saving signal is detected is within the activation time; or the activation time is an activation time after the position where the energy saving signal is detected among a plurality of activation times configured by the network side device.

Optionally, the energy saving signal window is located before the activation time, and the energy saving signal window includes one or more candidate positions; or the energy saving signal window includes candidate positions located before the activation time, and further includes candidate positions located within the activation time; or the energy saving signal window is within the activation time, and the energy saving signal window includes one or more candidate positions.

Optionally, the time intervals between a plurality of candidate positions included in the energy saving signal window are equal; or the candidate positions in the energy saving signal window are determined according to prior information of the network side device; or the candidate positions in the energy saving signal window are configured on demand.

Optionally, the energy saving signal includes a first signal subset and a second signal subset, and the first signal subset is located before the second signal sub set.

In a fifth aspect, a terminal, includes: a transceiver, a memory, a processor, and a program stored in the memory and executed by the processor, wherein: the processor is configured to detect an energy saving signal in an energy saving signal window; and if the energy saving signal is detected, the PDCCH is blindly detected within a target time, wherein a distance between the target time and a position where the energy saving signal is detected is within a preset time distance range.

Optionally, the target time is an activation time of DRX; the activation time is configured by a network side device, and the position where the energy saving signal is detected is within the activation time; or the activation time is an activation time after the position where the energy saving signal is detected among a plurality of activation times configured by the network side device.

Optionally, if the terminal is in a connected state, the position where the energy saving signal is detected is within the activation time, or the activation time is the activation time after the position where the energy saving signal is detected; and/or if the terminal is in a disconnected state, the position where the energy saving signal is detected is within the activation time.

Optionally, the energy saving signal window is located before the activation time, and the energy saving signal window includes one or more candidate positions; or the energy saving signal window includes candidate positions located before the activation time, and further includes candidate positions located within the activation time; or the energy saving signal window is within the activation time, and the energy saving signal window includes one or more candidate positions.

Optionally, the processor uses a low-power receiver to detect the energy saving signal at a candidate position of the energy saving signal; or the processor uses a passive receiver to detect the energy saving signal, wherein a position for detecting the energy saving signal at least includes a position where the energy saving signal window is located.

Optionally, time intervals between a plurality of candidate positions included in the energy saving signal window are equal; or the candidate positions in the energy saving signal window are determined according to prior information of an end for transmitting the energy saving signal; or the candidate positions in the energy saving signal window are configured on demand.

Optionally, if the candidate positions in the energy saving signal window are configured on demand, an interval between the candidate position for transmitting the energy saving signal and the PDCCH is 0, or the interval between the candidate position for transmitting the energy saving signal and the PDCCH does not exceed a preset value.

Optionally, the energy saving signal includes a first signal subset and a second signal subset, and the first signal subset is located before the second signal sub set.

Optionally, an interval between a location where the second signal subset is located and the PDCCH is 0, or the interval between the location where the second signal subset is located and the PDCCH does not exceed a preset value.

Optionally, if the energy saving signal is detected, blindly detecting the PDCCH within the activation time of DRX includes: If the first signal subset is detected, waking up a receiver of the terminal; If the second signal subset is detected, blindly detecting the PDCCH within the activation time of DRX.

Optionally, the terminal obtains configuration information of the energy saving signal window configured by the network side device in a semi-static, static or dynamic manner.

In a sixth aspect, a network side device, includes: a transceiver, a memory, a processor, and a program stored on the memory and executed by the processor, wherein the processor is configured to transmit an energy saving signal within an energy saving signal window, so that if the terminal has detected the energy saving signal, a PDCCH is blindly detected within a target time, wherein a distance between the target time and a position where the energy saving signal is detected is within a preset time distance range.

Optionally, the target time is an activation time of DRX; the activation time is configured by the network side device, and the position where the energy saving signal is detected is within the activation time; or the activation time is an activation time after the position where the energy saving signal is detected among a plurality of activation times configured by the network side device.

Optionally, if the terminal is in a connected state, the position where the energy saving signal is detected is within the activation time, or the activation time is the activation time after the position where the energy saving signal is detected; and/or if the terminal is in a disconnected state, the position where the energy saving signal is detected is within the activation time.

Optionally, the energy saving signal window is located before the activation time, and the energy saving signal window includes one or more candidate positions; or the energy saving signal window includes candidate positions located before the activation time, and further includes candidate positions located within the activation time; or the energy saving signal window is within the activation time, and the energy saving signal window includes one or more candidate positions.

Optionally, the processor uses a low-power transmitter to transmit the energy saving signal.

Optionally, the time intervals between a plurality of candidate positions included in the energy saving signal window are equal; or the candidate positions in the energy saving signal window are determined according to prior information of the network side device; or the candidate positions in the energy saving signal window are configured on demand.

Optionally, if the candidate positions in the energy saving signal window are configured on demand, an interval between the candidate position for transmitting the energy saving signal and the PDCCH is 0, or the interval between the candidate position for transmitting the energy saving signal and the PDCCH does not exceed a preset value.

Optionally, the energy saving signal includes a first signal subset and a second signal subset, and the first signal subset is located before the second signal sub set.

Optionally, an interval between a location where the second signal subset is located and the PDCCH is 0, or the interval between the location where the second signal subset is located and the PDCCH does not exceed a preset value.

Optionally, the network side device configures configuration information of the energy saving signal window for the terminal in a semi-static, static or dynamic manner.

In a seventh aspect, a computer-readable storage medium with a computer program stored thereon, wherein the computer program is executed by a processor to implement the steps in the PDCCH monitoring method.

In an embodiment of the present disclosure, the terminal detects an energy saving signal in an energy saving signal window; the terminal blindly detects the PDCCH within a target time if the energy saving signal is detected, a distance between the target time and a position where the energy saving signal is detected is within a preset time distance range. In this way, the blind detection of PDCCH is triggered by the energy saving signal, and power consumption of the terminal is reduced.

BRIEF DESCRIPTION OF THE DRAWINGS

FIG. 8 is a flowchart of a PDCCH blind detection method according to another embodiment of the present disclosure;

FIG. 9 is a structural diagram of a UE according to an embodiment of the present disclosure;

FIG. 10 is a structural diagram of a network side device according to an embodiment of the present disclosure;

DETAILED DESCRIPTION

In order to make the technical problems, technical solutions and advantages to be solved by the present disclosure clearer, a detailed description will be given below in conjunction with the accompanying drawings and specific embodiments.

Figure 1:
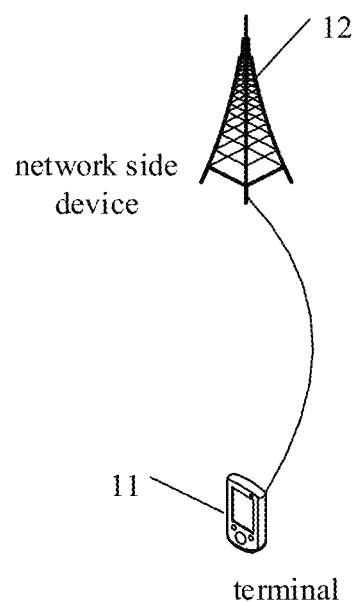
FIG. 1 is a schematic diagram of a network structure according to an embodiment of the present disclosure.

FIG. 1 is a schematic diagram of a network structure according to an embodiment of the present disclosure. As shown in FIG. 1, it includes a terminal 11 and a network side device 12. The terminal 11 may be a User Equipment (UE) or other terminals, for example, mobile phones, Tablet Personal Computers, laptop computers, personal digital assistants (PDAs), Mobile Internet Devices (MID) or wearable devices, it should be noted that the specific types of terminals are not limited in the embodiments of the present disclosure. The network side device 12 may be a base station, such as a macro station, LTE eNB, 5G NR NB, etc. The network side device may also be a small station, such as a low power node (LPN), pico, femto, etc. The network side device can be an access point (AP); the base station can also be a network node composed of a central unit (CU) and a plurality of transmission reception points (TRPs) managed and controlled by the CU. It should be noted that the specific types of network side devices are not limited in the embodiments of the present disclosure.

Figure 2:
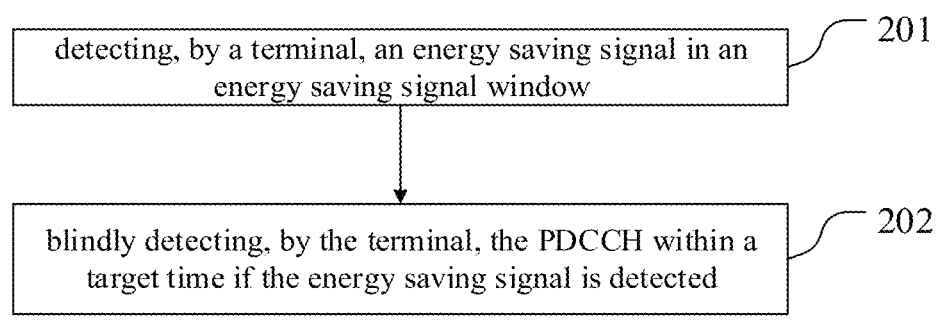
FIG. 2 is a flowchart of a PDCCH blind detection method according to an embodiment of the present disclosure.

FIG. 2 is a flowchart of a PDCCH blind detection method according to an embodiment of the present disclosure. As shown in FIG. 2, it includes the following steps.

201, the terminal detects an energy saving signal in an energy saving signal window;

202, if the energy saving signal is detected, the terminal blindly detects the PDCCH within a target time, in which a distance between the target time and a position where the energy saving signal is detected is within a preset time distance range.

In the embodiments of the present disclosure, the foregoing energy saving signal may be a signal used to activate (or be referred to as trigger) blind detection of the PDCCH, and if the terminal detects the energy saving signal, the PDCCH is blindly detected within the foregoing activation time. For example, the energy saving signal may be a wakeup signal (Wakeup Signal, WUS), so the energy saving signal window may be a WUS window, of course, this is not limited. For example, the energy saving signal may also be other signals defined in the protocol, or other signals agreed in advance by the network side device and the terminal.

The above-mentioned energy saving signal window may be configured by the network side device for the terminal before step 201 is performed, or pre-defined in the protocol, or pre-configured by the terminal, etc., which is not limited.

In addition, the energy saving signal window may include one or more candidate positions, and the terminal may detect the energy saving signal at these candidate positions. It should be noted that, in the embodiments of the present disclosure, the energy saving signal window may also be referred to as an energy saving signal transmission window, and the candidate position may also be referred to as a transmission candidate position.

The position where the energy saving signal is detected may refer to the position where the energy saving signal is detected within the energy saving signal window. For example, the energy saving signal window includes a plurality of candidate positions, and the terminal detects the energy saving signal at one of the candidate positions, so that the candidate position is the position where the energy saving signal is detected.

It should be noted that in the embodiments of the present disclosure, the position may refer to a position in the time domain, that is, the position at which the energy saving signal is detected above may also be referred to as the time when the energy saving signal is detected.

The foregoing preset time distance range may be configured by the network side for the terminal, or pre-configured by the terminal, or pre-defined in the protocol, such as 0, 10 us, 34 us, 25 us, or 1 OFDM symbol, etc., which is not limited.

In step 202, if the terminal detects the above-mentioned energy saving signal, blindly detecting the PDCCH within the target time can be understood to mean that if the terminal detects the above-mentioned energy saving signal, it activates (or is called trigger) the blind detection of the PDCCH at the above-mentioned target time. In this way, the terminal can blindly detect the PDCCH immediately after detecting the above-mentioned energy saving signal, or blindly detect the PDCCH after a time interval of 10 us, 34 us, 25 us, or 1 OFDM symbol.

Through the above steps, it can be realized that the PDCCH is blindly detected after the energy saving signal is detected, thereby avoiding the blind detection of the terminal at each activation time, thereby saving the power consumption of the terminal. In addition, since step 202 is to blindly detect the PDCCH after the energy saving signal is detected, the position of the blind PDCCH is flexibly determined according to the position where the energy saving signal is detected.

In addition, in the embodiments of the present disclosure, the above-mentioned method may be applied to blind detection of PDCCH in an unlicensed frequency band or a licensed frequency band. The state of the above terminal may be a connected state (RRC_Connected) or a non-connected state, such as an idle state (RRC_IDLE) or an inactive state (RRC_Inactive).

As an optional implementation, the target time is the activation time of DRX.

The activation time is configured by the network side device, and the position where the energy saving signal is detected is within the activation time; or the activation time is an activation time after the position where the energy saving signal is detected among a plurality of activation times configured by the network side device.

It should be noted that, in the embodiments of the present disclosure, the activation time may refer to the activation time period in the DRX cycle, for example: On duration period (abbreviated as DRX on cycle), of course, the activation time may also be referred to as the wake-up time.

In addition, the network side device may pre-configure a plurality of activation times for the terminal, and the activation time in step 202 is a plurality of activation times configured by the network side device, including the activation time at the location where the energy saving signal is detected, or the activation time after the position where the energy saving signal is detected, which may specifically refer to the activation time closest to the position where the energy saving signal is detected.

The foregoing detection of the position of the energy saving signal within the activation time may mean that the terminal detects the energy saving signal within the activation time, and after detecting the energy saving signal, blindly detects the PDCCH within the activation time. The above activation time is the activation time after detecting the position of the energy saving signal, which may mean that the energy saving signal window is located before a certain activation time. When the terminal detects the energy saving signal in the energy saving signal window, the blind detection of the PDCCH is performed in the activation time, where the activation time can be understood as the activation time closest to the energy saving signal window.

In this implementation, it is possible to prevent the terminal from blindly detecting the PDCCH at each activation time, thereby saving the power consumption of the terminal. For example, if the position where the energy saving signal is detected is before the above activation time, the terminal starts blind detection of the PDCCH at the beginning of the activation time, or the position where the energy saving signal is detected is within the activation time, then if the energy saving signal is detected, the terminal starts blindly detecting the PDCCH. This can further save the power consumption of the terminal, because the terminal can start blind detection from a starting point or non-starting point within the activation time.

It should be noted that in the embodiments of the present disclosure, the above target time is not limited to the activation time of DRX. For example, in some scenarios, when the network side device does not configure the activation time, the above target time may be a time domain resource whose distance to a position where the energy saving signal is detected is within a preset time distance range.

As an optional implementation, if the terminal is in the connected state, the position where the energy saving signal is detected is within the activation time, or the activation time is an activation time after the position where the energy saving signal is detected; and/or if the terminal is in a disconnected state, the position where the energy saving signal is detected is within the activation time.

The above and/or can represent any one of the following three ways:

1. If the terminal is in the connected state, the position where the energy saving signal is detected is within the activation time, or the activation time is the activation time after the position where the energy saving signal is detected, but for a non-connection state, it is not limited.

2. If the terminal is in the non-connected state, the position where the energy saving signal is detected is within the activation time, and for the connected state, it is not limited.

3. If the terminal is in a connected state, the position where the energy saving signal is detected is within the activation time, or the activation time is the activation time after the position where the energy saving signal is detected; and if all the terminal is in a non-connected state, the position where the energy saving signal is detected is within the activation time.

In this way, if the terminal is in the connected state, the energy saving signal can be sent within a certain activation time, so that the terminal starts blind detection of the PDCCH at a non-starting point position of the activation time, so as to reduce the time required for the terminal to perform the blind detection. And if the terminal is in the connected state, the energy saving signal can be sent before a certain activation time, so that the terminal starts to blindly detection of the PDCCH at the starting point of the activation time, so that the terminal in the connected state does not need to blindly detect the PDCCH during all the activation time.

In addition, in this embodiment, if the terminal is in a disconnected state, it can send an energy saving signal during a certain activation time, so that the terminal starts blind detection of the PDCCH at a non-starting point position of the activation time, so as to reduce the time for the terminal to perform the blind detection.

It should be noted that the aforementioned non-starting position may refer to, when the location where the energy saving signal is detected is within the activation time, a position that is within the activation time and whose distance to the position where the energy saving signal is detected is 0 or less than a preset value.

As an optional implementation, the energy saving signal window is located before the activation time, and the energy saving signal window includes one or more candidate positions; or the energy saving signal window includes candidate positions located before the activation time, and also includes candidate positions located within the activation time; or the energy saving signal window is within the activation time, and the energy saving signal window includes one or more candidate positions.

In this implementation, it is possible to configure the energy saving signal window before the activation time, so that after the energy saving signal is detected, the PDCCH blind detection can be performed at the activation time.

Figure 3:
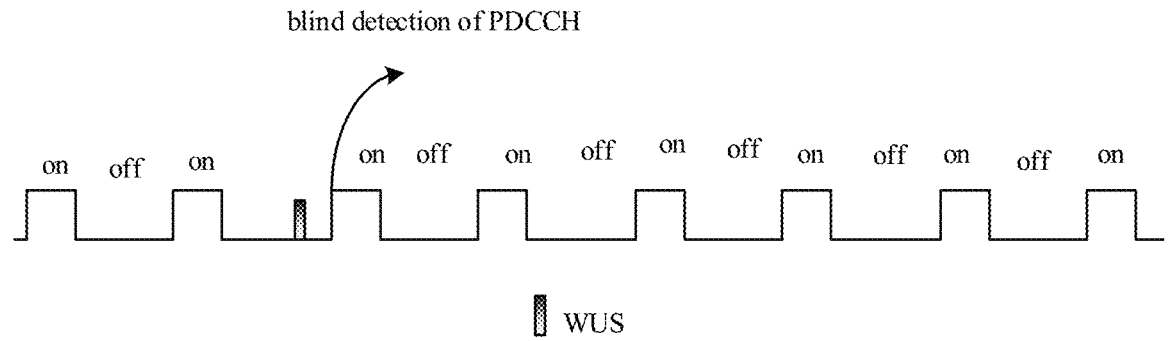
FIG. 3 is a schematic diagram of a WUS window according to an embodiment of the present disclosure.

For example, the WUS window is configured by the network side device periodically, the WUS window is located before the DRX duration period (abbreviated as DRX on period), as shown in FIG. 3, on represents the DRX on period in the DRX cycle, off represents the opportunity for DRX cycle (abbreviated as DRX off cycle). The WUS window configured by the network side device is before the DRX on period, and the number of candidate positions for sending WUS in the WUS window is 1. In this way, the terminal detects WUS in each WUS window, and only blindly detects the PDCCH in the DRX on period after WUS is detected, so the power consumption of the terminal is greatly reduced. Optionally, in the embodiment of the present disclosure, the PDCCH may be a PDCCH scrambled by a Cell Radio Network Temporary Identifier (C-RNTI), of course, this is not limited.

In addition, in the above embodiment, it can also be realized that the energy saving signal window includes candidate positions located before the activation time, and also includes candidate positions within the activation time, that is, the energy saving signal window spans the starting point of the activation time, so that the terminal start blindly detecting PDCCH at the starting position or the non-starting position of the activation time to further save the power consumption of the terminal.

Figure 4:
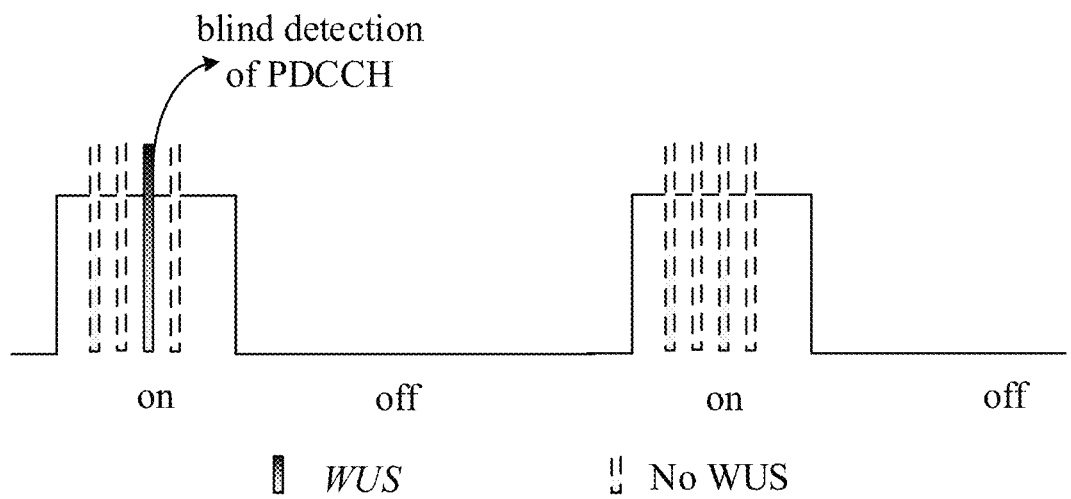
FIG. 4 is a schematic diagram of a WUS window provided by another embodiment of the present disclosure.

For example, as shown in FIG. 4, the network side device periodically configures the WUS window, the WUS window spans the starting point of the DRX on period, and the number of candidate positions for sending WUS in the WUS window is more than one. The terminal detects WUS at the plurality of candidate positions in the WUS window. The dotted rectangle indicates the candidate position but no WUS is sent. After the terminal detects the real WUS, it triggers PDCCH detection. In this way, it can be realized that the time when the data arrives is any time in the DRX on cycle, and the power consumption is reduced more obviously.

In addition, in the foregoing implementation, it is also possible to realize that the energy saving signal window is within the activation time. In this way, blind detection of PDCCH can be started at the non-starting position in the activation time. Because in practical applications, the time when the data arrives is not necessarily the starting point of the activation time. Therefore, the time for the terminal to perform blind detection is further reduced, the power consumption of the terminal is further saved.

Figure 5:
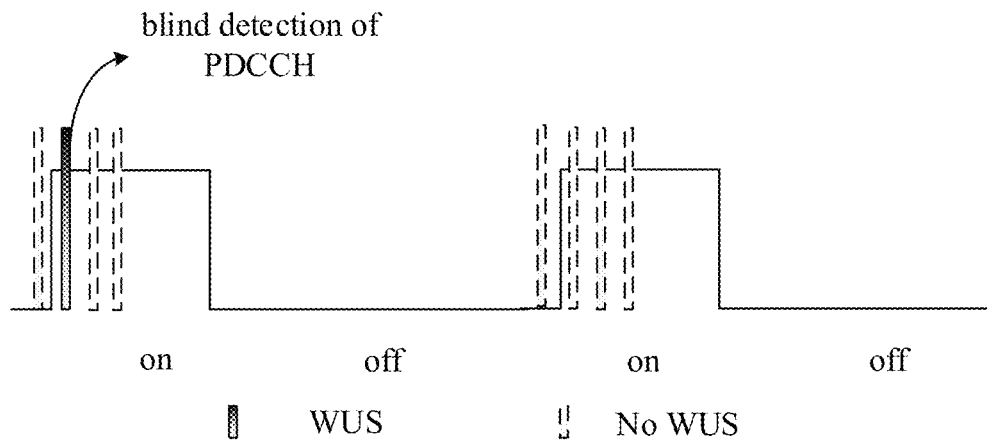
FIG. 5 is a schematic diagram of a WUS window provided by yet another embodiment of the present disclosure.

For example, as shown in FIG. 5, the network side device periodically configures the WUS window, the WUS window is located within the DRX on period, and the number of candidate positions for sending WUS in the WUS window is more than one. In this way, the terminal detects WUS at a plurality of candidate positions in the WUS window. The dotted rectangle indicates the candidate position but no WUS is sent. After the terminal detects the real WUS, it triggers PDCCH detection. Since the time when the data arrives is not necessarily the starting point of the DRX on period, the time for the terminal to blindly detect the PDCCH is sometimes much less, and the power consumption is significantly reduced.

As an optional implementation, the terminal uses a low-power receiver to detect the energy saving signal at a candidate position of the energy saving signal; or the terminal adopts a passive receiver to detect the energy saving signal, in which the position for detecting the energy saving signal at least includes a position where the energy saving signal window is located.

The aforementioned low-power receiver may be a radio frequency circuit different from the receiving data channel, and the low-power receiver has a lower power consumption than the receiver receiving the data channel.

For example, for the NR scenario in the authorized frequency band with a long coverage requirement, a radio frequency circuit working in a lower frequency band can be used to send and receive the energy saving signal. Of course, data and the energy saving signal may be sent and received at the same frequency, but with different RF channels. At this time, the energy saving signal receiving circuit omits high-power parts compared with the data receiving circuit, such as a low-noise amplifier and a phase-locked loop and other high-power devices, a low-power energy saving signal receiver is realized to further reduce power consumption.

The above-mentioned passive receiver may mean that the receiver does not need power when detecting the energy saving signal. For example, the passive receiving circuit detects the energy saving signal, and the passive circuit adopts the power of a transmitted signal to detect the energy saving signal and wake up the receiver. The terminal does not need to consume power, so it can receive the energy saving signal well. This solution can be applied to an energy saving scenarios in the unlicensed frequency band with a typical coverage range (for example, a coverage range of 100 meters). In addition, the passive receiver is used to detect the energy saving signal means that the terminal adopts the passive receiver to detect energy saving all the time. Since the passive energy detection receiver does not need to consume power, the power consumption of the terminal can be further reduced.

As an optional implementation, the time intervals between a plurality of candidate positions included in the energy saving signal window are equal; or the candidate positions in the energy saving signal window are determined according to priori information of a sending end of the energy saving signal; or the candidate positions in the energy saving signal window are configured on-demand.

For example, the network side device may configure an energy saving signal window according to the DRX transmission period, the candidate position of the energy saving signal may be located within the DRX on period, and the number of candidate positions for sending the energy saving signal in the energy saving signal window is one or more.

The time interval between the plurality of candidate positions included in the energy saving signal window may be equal, that means the plurality of candidate positions in the energy saving signal window are arranged at equal time intervals. Of course, the embodiment of the present disclosure does not limit this. For example, unequal time intervals may also be configured.

The foregoing determination based on the priori information of the sending end of the energy saving signal may be that the sending end of the energy saving signal (for example, a network side device) determines the candidate position in the energy saving signal window according to the prior information. For example, the possible starting point for data transmission in unlicensed frequency band can be determined in advance. When there is a definite correspondence between the starting point of the DRX on period and a sub-frame boundary, the candidate position of each energy saving signal can be determined in advance according to the prior information of the possible starting point for data transmission in unlicensed frequency band. Of course, the foregoing priori information is not limited to the priori information of the possible starting point for data transmission in the unlicensed frequency band, for example, it can also be the prior information of the possible starting point for data transmission in the licensed frequency band, or the a priori information of the possible transmission interval, etc.

In this embodiment, since the candidate position of the energy saving signal is determined by the priori information, the candidate position can be closer to the starting point of data transmission, so that the terminal need to blindly detect in fewer position and the purpose of further saving power consumption of the terminal is achieved.

The candidate positions in the above energy saving signal window are configured on demand. The candidate positions are determined according to actual needs, so that the candidate positions can be closer to actual positions for data transmission, so that the terminal needs to blindly detect in fewer positions, the purpose of further saving power consumption of the terminal is achieved.

Optionally, if the candidate positions in the energy saving signal window are configured on demand, the interval between the candidate position for transmitting the energy saving signal and the PDCCH is 0, or the interval between the candidate position for transmitting the energy saving signal and the PDCCH does not exceed a preset value.

The above-mentioned preset value may be pre-defined in the protocol or pre-configured by the network side device. For example, the preset value can be 34 us or 25 us or 1 OFDM symbol. The foregoing candidate position for transmitting the energy saving signal is also the position where the energy saving signal is detected in step 202, because when the energy saving signal is transmitted at the candidate position, the terminal will detect the energy saving signal at the candidate position.

In this implementation, since the interval between the candidate position for transmitting the energy saving signal and the PDCCH is 0, or the interval between the candidate position for transmitting the energy saving signal and the PDCCH does not exceed a preset value, which enables the terminal to detect the PDCCH immediately after triggering the blind detection of the PDCCH, thereby further saving the power consumption of the terminal. It should be noted that in this implementation, one or more candidate positions may be included in the energy saving signal window.

Figure 6:
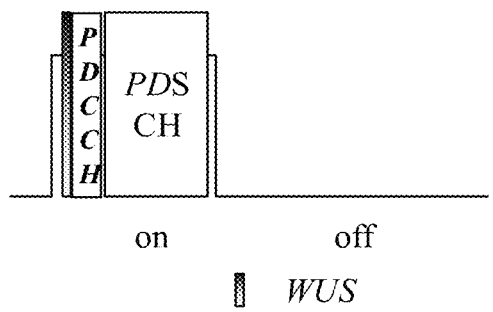
FIG. 6 is a schematic diagram of a WUS window provided by still yet another embodiment of the present disclosure.

For example, in the WUS window, the candidate positions are configured in an on-demand manner, and the WUS is sent by choosing a position where the gap between the position and the PDCCH of the terminal is 0 or does not exceed a certain preset value. As long as the terminal has detected the WUS, it immediately enters the step of detecting the receipt of PDCCH. This feature is particularly suitable for unlicensed frequency bands and completely avoids too much blind detection of PDCCHs, as shown in FIG. 6. Of course, for licensed frequency bands, this solution can also achieve the lowest power consumption overhead. In this solution, actually there is only one transmission position in the WUS sending window. The terminal needs to detect the WUS window defined as the WUS sending window. The terminal always detects the WUS in the WUS window. In addition, the terminal can adopt a radio frequency circuit that is different from the receiving data channel to receive WUS. For example, in the NR scenario of an authorized frequency band with a long coverage requirement, a radio frequency circuit working in a lower frequency band can be used to specifically send and receive the WUS signal. Of course, the data and the WUS may be sent and received at the same frequency, but different RF channels are used. At this time, the WUS receiving circuit omits high power consumption parts, such as a low noise amplifier, a phase-locked loop, etc, as compared with the data receiving circuit. A low power consumption WUS receiver is achieved. Of course, the terminal can also use a passive energy detection receiver to always detect the WUS. The passive energy detection receiver means that the receiver does not need power when detecting the WUS signal, such as detecting the WUS signal through a passive receiving circuit. The passive circuit detects the WUS by using the power of the transmitted signal and wakes up the receiver. Since the terminal does not consume power, it can receive the WUS well. This solution is suitable for energy saving in unlicensed frequency bands with a typical coverage of 100 meters.

As an optional implementation, the energy saving signal includes a first signal subset and a second signal subset, and the first signal subset is located before the second signal subset.

The first signal subset may be one or more symbols. Similarly, the second signal subset may also be one or more symbols. In addition, it should be noted that the foregoing first signal subset and second signal subset may be referred to as two subsets of one energy saving signal, and of course, they may also be referred to as two different energy saving signals. In addition, the first signal subset may be sent through a candidate position in the energy saving signal window, and the second signal subset may not be sent at a candidate position in the energy saving signal window, but is sent at a non-candidate position closest to the PDCCH within the energy saving signal window. Of course, the second signal subset may also be sent at a certain candidate position within the energy saving signal window.

In this embodiment, since the first signal subset and the second signal subset are used to trigger the blind detection of the PDCCH by the terminal, it is possible to wake up the terminal through one signal subset, and trigger the blind detection of the PDCCH by the terminal through another signal subset. Thus, the power consumption of the terminal can be further saved. For example, if the above energy saving signal is detected, the terminal blindly detects the PDCCH within the DRX activation time, which may include: if the first signal subset is detected, the terminal wakes up the receiver of the terminal; if the second signal subset is detected, the terminal blindly detects the PDCCH within the activation time of DRX.

The process of waking up the receiver of the terminal occurs at a climbing phase of the transmission power of the terminal, and then the second signal subset is detected at all positions within the energy saving signal window, and when the second signal subset is detected, the blind detection of PDCCH is started.

Optionally, the interval between the location of the second signal subset and the PDCCH is 0, or the interval between the location of the second signal subset and the PDCCH does not exceed a preset value.

Since the interval between the location of the second signal subset and the PDCCH is 0 or does not exceed the preset value, the time required for the terminal to blindly detect the PDCCH is further reduced, so as to further save the power consumption of the terminal.

Optionally, the receiving complexity of the first signal subset is higher than the receiving complexity of the second signal subset. In this way, because the reception complexity (or detection complexity) of the second signal subset is relatively low, it is possible to blindly detect the PDCCH immediately after the second signal subset is detected, which can further reduce the number of positions where the terminal needs to blindly detect the PDCCH.

Figure 7:
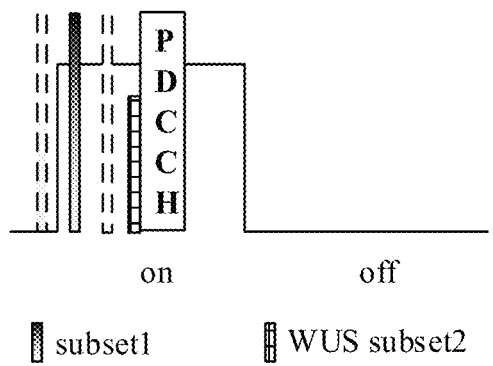
FIG. 7 is a schematic diagram of a WUS window provided by still yet another embodiment of the present disclosure.

For example, the PDCCH blind detection method shown in FIG. 7 is the best power saving method. In this embodiment, compared with the on-demand method described above for sending WUS, this embodiment can reduce the changes to the standard. For example, the network side device configures the WUS window according to the DRX transmission cycle, and the candidate position for sending WUS in the WUS window is determined. If the base station can know in advance that the data is about to be transmitted, a signal subset of WUS signals (abbreviated as a subset) can be sent at a certain candidate location, and then another subset of WUS signals can be sent before the PDCCH, and finally another subset of the WUS is sent at a position whose distance to the PDCCH is 0 or does not exceed a certain preset value, as shown in FIG. 7. The network side device sends WUS subset 1 at a certain WUS candidate location before the data arrives. The sending location is preferably as far back as possible in the WUS window. Of course, the candidate location can also be located before the duration period, and the reception complexity of WUS subset 1 is significantly greater than that of WUS subset 2. The network side device sends WUS subset 2 at a position whose distance to the PDCCH is 0 or that is very close to the PDCCH, and WUS subset 2 is not necessarily transmitted at the original predefined WUS candidate position, but the reception complexity of WUS subset 2 is very low. The terminal can detect WUS subset 2 at all positions in the WUS window after receiving WUS subset 1. Since the position for transmitting WUS subset 1 can be the last allowed candidate position, the time left for WUS subset 2 to always be detected is already very short. However, the detection complexity of WUS subset 2 is relatively low, which can further reduce reception power consumption of the terminal.

Optionally, in the embodiment of the present disclosure, the terminal obtains the configuration information of the energy saving signal window configured by the network side device in a semi-static, static, or dynamic manner.

The above configuration information may refer to information related to the configuration of the energy saving signal window, such as part or all of the information such as the size and position of the window and the number of candidate sending positions.

For example, the network side device can configure information related to energy saving signal window for the terminal with semi-static, static, or dynamic manner, such as part or all of the information such as the size and position of the window and the number of candidate sending positions. A preferred way is that the network side device notifies the configuration information of the energy saving signal window through system information.

In the embodiment of the present disclosure, the terminal detects the energy saving signal within the energy saving signal window; if the energy saving signal is detected, the terminal blindly detects the PDCCH within the activation time of discontinuous reception of DRX. The activation time is configured by the network side device and the position where the energy saving signal is detected is within the activation time; or the activation time is configured by the network side device and is the activation time after the position where the energy saving signal is detected. In this way, the blind detection of the PDCCH can be triggered by the energy saving signal, thereby reducing the power consumption of the terminal.

FIG. 8 is a flowchart of a PDCCH monitoring method provided by an embodiment of the present disclosure. As shown in FIG. 8, it includes the following steps.

801, the network side device sends an energy saving signal within an energy saving signal window, so that if the terminal detects the energy saving signal, it blindly detects the PDCCH within a target time, in which a distance between the target time and a location where the energy saving signal is detected is within a preset time distance range.

Optionally, the target time is an activation time of DRX.

The activation time is configured by a network side device, and the position where the energy saving signal is detected is within the activation time; or the activation time is an activation time after the position where the energy saving signal is detected among a plurality of activation times configured by the network side device.

Optionally, if the terminal is in a connected state, the position where the energy saving signal is detected is within the activation time, or the activation time is an activation time after the position where the energy saving signal is detected; and/or if the terminal is in a disconnected state, the position where the energy saving signal is detected is within the activation time.

Optionally, the energy saving signal window is located before the activation time, and the energy saving signal window includes one or more candidate positions; or the energy saving signal window includes candidate positions located before the activation time, and also includes candidate positions located within the activation time; or the energy saving signal window is within the activation time, and the energy saving signal window includes one or more candidate positions.

Optionally, the network side device uses a low-power transmitter to send the energy saving signal.

Optionally, the time intervals between a plurality of candidate positions included in the energy saving signal window are equal; or the candidate positions in the energy saving signal window are determined according to prior information of the network side device; or the candidate positions in the energy saving signal window are configured on demand.

Optionally, if the candidate positions in the energy saving signal window are configured on demand, an interval between the candidate position for transmitting the energy saving signal and the PDCCH is 0, or the interval between the candidate position for transmitting the energy saving signal and the PDCCH does not exceed a preset value.

Optionally, the energy saving signal includes a first signal subset and a second signal subset, and the first signal subset is located before the second signal sub set.

Optionally, an interval between a location of the second signal subset and the PDCCH is 0, or the interval between the location of the second signal subset and the PDCCH does not exceed a preset value.

Optionally, the network side device configures configuration information of the energy saving signal window for the terminal in a semi-static, static, or dynamic manner.

It should be noted that this embodiment is used as an implementation of the network side device corresponding to the embodiment shown in FIG. 2. For specific implementation, the related description of the embodiment shown in FIG. 2 may be referred. In order to avoid repetitive description, this embodiment will not be repeated, and the same beneficial effects can be achieved.

FIG. 9 is a structural diagram of a terminal according to an embodiment of the present disclosure. As shown in FIG. 9, a terminal 900 includes: a detection module 901, configured to detect an energy saving signal in a wake-up signal energy saving signal window; a blind detection module 902, configured to blindly detect the PDCCH within a target time if the energy saving signal is detected, wherein a distance between the target time and a position where the energy saving signal is detected is within a preset time distance range.

Optionally, the target time is an activation time of DRX.

The activation time is configured by a network side device, and the position where the energy saving signal is detected is within the activation time; or the activation time is an activation time after the position where the energy saving signal is detected among a plurality of activation times configured by the network side device.

Optionally, if the terminal is in a connected state, the position where the energy saving signal is detected is within the activation time, or the activation time is an activation time after the position where the energy saving signal is detected; and/or if the terminal is in a disconnected state, the position where the energy saving signal is detected is within the activation time.

Optionally, the energy saving signal window is located before the activation time, and the energy saving signal window includes one or more candidate positions; or the energy saving signal window includes candidate positions located before the activation time, and also includes candidate positions located within the activation time; or the energy saving signal window is within the activation time, and the energy saving signal window includes one or more candidate positions.

Optionally, the network side device uses a low-power transmitter to send the energy saving signal.

Optionally, the time intervals between a plurality of candidate positions included in the energy saving signal window are equal; or the candidate positions in the energy saving signal window are determined according to prior information of the network side device; or the candidate positions in the energy saving signal window are configured on demand.

Optionally, if the candidate positions in the energy saving signal window are configured on demand, an interval between the candidate position for transmitting the energy saving signal and the PDCCH is 0, or the interval between the candidate position for transmitting the energy saving signal and the PDCCH does not exceed a preset value.

Optionally, the energy saving signal includes a first signal subset and a second signal subset, and the first signal subset is located before the second signal sub set.

Optionally, an interval between a location of the second signal subset and the PDCCH is 0, or the interval between the location of the second signal subset and the PDCCH does not exceed a preset value.

Optionally, the blind detection module 902 is configured to wake up a receiver of the terminal if the first signal subset is detected; and if the second signal subset is detected, the PDCCH is blindly detected in the activation time of DRX.

Optionally, the terminal obtains configuration information of the energy saving signal window configured by the network side device in a semi-static, static or dynamic manner.

It should be noted that the above-mentioned terminal 900 in this embodiment may be a terminal of any implementation in the method embodiment of the present disclosure. Any implementation of the terminal in the method embodiment of the disclosure may be used by the terminal in this embodiment. The terminal 900 may implement and achieve the same beneficial effects, which will not be repeated here.

FIG. 10 is a structural diagram of a network side device according to an embodiment of the present disclosure. As shown in FIG. 10, the network side device 1000 includes: a sending module 1001, configured to send an energy saving signal within an energy saving signal window, so that if the terminal has detected the energy saving signal, it will blindly detect the PDCCH within a target time, in which a distance between the target time and the position where the energy saving signal is detected is within a preset time distance range.

Optionally, the target time is an activation time of DRX.

The activation time is configured by a network side device, and the position where the energy saving signal is detected is within the activation time; or the activation time is an activation time after the position where the energy saving signal is detected among a plurality of activation times configured by the network side device.

Optionally, if the terminal is in a connected state, the position where the energy saving signal is detected is within the activation time, or the activation time is an activation time after the position where the energy saving signal is detected; and/or if the terminal is in a disconnected state, the position where the energy saving signal is detected is within the activation time.

Optionally, the energy saving signal window is located before the activation time, and the energy saving signal window includes one or more candidate positions; or the energy saving signal window includes candidate positions located before the activation time, and also includes candidate positions located within the activation time; or the energy saving signal window is within the activation time, and the energy saving signal window includes one or more candidate positions.

Optionally, the network side device uses a low-power transmitter to send the energy saving signal.

Optionally, the time intervals between a plurality of candidate positions included in the energy saving signal window are equal; or the candidate positions in the energy saving signal window are determined according to prior information of the network side device; or the candidate positions in the energy saving signal window are configured on demand.

Optionally, if the candidate positions in the energy saving signal window are configured on demand, an interval between the candidate position for transmitting the energy saving signal and the PDCCH is 0, or the interval between the candidate position for transmitting the energy saving signal and the PDCCH does not exceed a preset value.

Optionally, the energy saving signal includes a first signal subset and a second signal subset, and the first signal subset is located before the second signal sub set.

Optionally, an interval between a location of the second signal subset and the PDCCH is 0, or the interval between the location of the second signal subset and the PDCCH does not exceed a preset value.

Optionally, the network side device configures configuration information of the energy saving signal window for the terminal in a semi-static, static, or dynamic manner.

It should be noted that the above-mentioned network side device 1200 in this embodiment may be a network side device in any implementation in the method embodiments of the present disclosure, and any implementation of the network side device in the method embodiments of the disclosure can be implemented by the above-mentioned network side device 1200 in this embodiment and achieve the same beneficial effect, which will not be repeated here.

Figure 11:
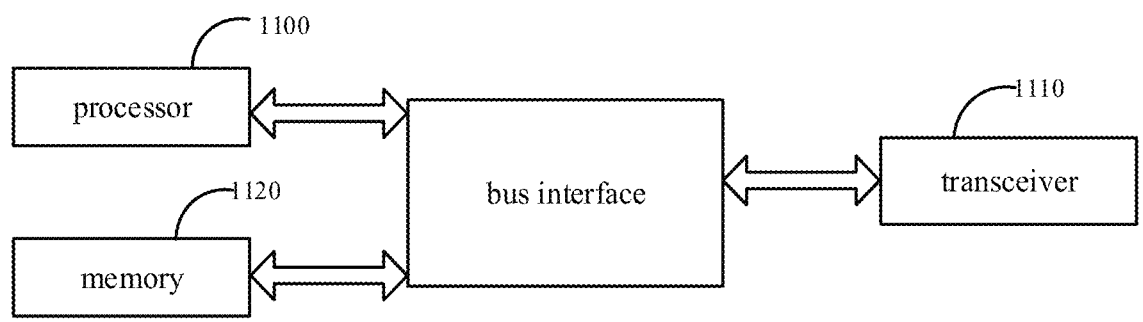
FIG. 11 is a structural diagram of a UE according to another embodiment of the present disclosure.

FIG. 11 is a structural diagram of another terminal according to an embodiment of the present disclosure. As shown in FIG. 11, the terminal includes: a transceiver 1110, a memory 1120, a processor 1100, and a program stored in the memory 1120 and executed on the processor 1200.

The processor is configured to detect an energy saving signal in a wake-up signal energy saving signal window; and if the energy saving signal is detected, the PDCCH is blindly detected within a target time, wherein a distance between the target time and a position where the energy saving signal is detected is within a preset time distance range.

The transceiver 1110 may be used to receive and send data under the control of the processor 1100.

In FIG. 11, the bus architecture may include any number of interconnected buses and bridges. Specifically, various circuits of one or more processors represented by the processor 1100 and the memory represented by the memory 1120 are linked together. The bus architecture can also link various other circuits such as peripheral devices, voltage regulators, power management circuits, etc., which are all known in the art, and therefore, no further descriptions are provided herein. The bus interface provides the interface. The transceiver 1110 may be a plurality of elements, including a transmitter and a receiver, and provide a unit for communicating with various other devices on the transmission medium.

The processor 1100 is responsible for managing the bus architecture and general processing, and the memory 1120 may store data used by the processor 1100 when performing operations.

It should be noted that the memory 1120 is not limited to only being on the terminal, and the memory 1120 and the processor 1100 may be separated in different geographic locations.

Optionally, the target time is an activation time of DRX.

The activation time is configured by a network side device, and the position where the energy saving signal is detected is within the activation time; or the activation time is an activation time after the position where the energy saving signal is detected among a plurality of activation times configured by the network side device.

Optionally, if the terminal is in a connected state, the position where the energy saving signal is detected is within the activation time, or the activation time is an activation time after the position where the energy saving signal is detected; and/or if the terminal is in a disconnected state, the position where the energy saving signal is detected is within the activation time.

Optionally, the energy saving signal window is located before the activation time, and the energy saving signal window includes one or more candidate positions; or the energy saving signal window includes candidate positions located before the activation time, and also includes candidate positions located within the activation time; or the energy saving signal window is within the activation time, and the energy saving signal window includes one or more candidate positions.

Optionally, the transceiver adopts a low-power receiver to detect the energy saving signal at a candidate position of the energy saving signal; or the transceiver adopts a passive receiver to detect the energy saving signal, wherein the position where the energy saving signal is detected at least includes a position of the energy saving signal window.

Optionally, the time intervals between a plurality of candidate positions included in the energy saving signal window are equal; or the candidate positions in the energy saving signal window are determined according to prior information of the network side device; or the candidate positions in the energy saving signal window are configured on demand.

Optionally, if the candidate positions in the energy saving signal window are configured on demand, an interval between the candidate position for transmitting the energy saving signal and the PDCCH is 0, or the interval between the candidate position for transmitting the energy saving signal and the PDCCH does not exceed a preset value.

Optionally, the energy saving signal includes a first signal subset and a second signal subset, and the first signal subset is located before the second signal sub set.

Optionally, an interval between a location of the second signal subset and the PDCCH is 0, or the interval between the location of the second signal subset and the PDCCH does not exceed a preset value.

Optionally, if the energy saving signal is detected, blindly detecting the PDCCH within the activation time of DRX includes: if the first signal subset is detected, waking up a receiver of the terminal; if the second signal subset is detected, blindly detecting the PDCCH within the activation time of DRX.

Optionally, the terminal obtains configuration information of the energy saving signal window configured by the network side device in a semi-static, static or dynamic manner.

It should be noted that the above-mentioned terminal in this embodiment may be a terminal in any implementation in the method embodiment of the present disclosure, and any implementation of the terminal in the method embodiment of the disclosure may be implemented by the terminal, the same beneficial effects can be achieved, which will not be repeated here.

Figure 12:
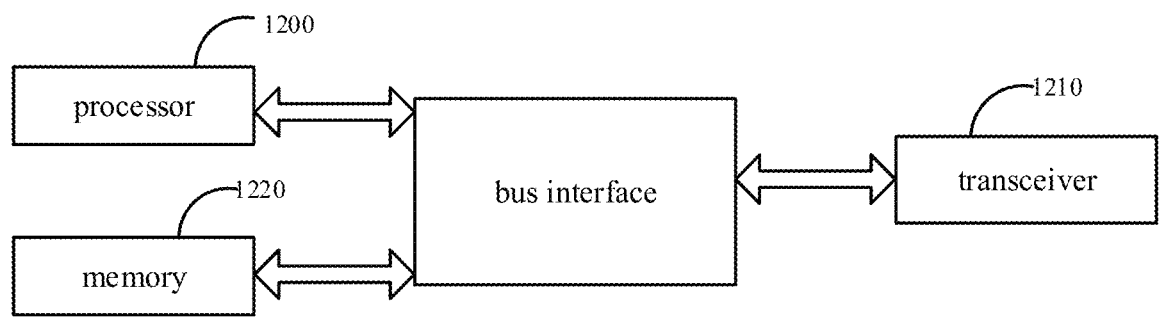
FIG. 12 is a structural diagram of a network side device according to another embodiment of the present disclosure.

FIG. 12 is a structural diagram of another network side device according to an embodiment of the present disclosure. As shown in FIG. 12, the network side device includes a transceiver 1210, a memory 1220, a processor 1200, and a program stored on the memory 1220 and executed by the processor.

The memory 1220 is configured to send an energy saving signal within an energy saving signal window, so that if the terminal has detected the energy saving signal, it will blindly detect the PDCCH within a target time, in which a distance between the target time and a position where the energy saving signal is detected is within a preset time distance range.

The transceiver 1210 may be used to receive and send data under the control of the processor 1200.

In FIG. 12, the bus architecture may include any number of interconnected buses and bridges. Specifically, various circuits of one or more processors represented by the processor 1200 and the memory represented by the memory 1220 are linked together. The bus architecture can also link various other circuits such as peripheral devices, voltage regulators, power management circuits, etc., which are all known in the art, and therefore, no further descriptions are provided herein. The bus interface provides the interface. The transceiver 1210 may be a plurality of elements, that is, includes a transmitter and a receiver, and provides a unit for communicating with various other devices on the transmission medium.

The processor 1200 is responsible for managing the bus architecture and general processing, and the memory 1220 can store data used by the processor 1200 when performing operations.

It should be noted that the memory 1220 is not limited to only being on the network side device, and the memory 1220 and the processor 1200 may be separated in different geographic locations.

Optionally, the target time is an activation time of DRX.

The activation time is configured by a network side device, and the position where the energy saving signal is detected is within the activation time; or the activation time is an activation time after the position where the energy saving signal is detected among a plurality of activation times configured by the network side device.

Optionally, if the terminal is in a connected state, the position where the energy saving signal is detected is within the activation time, or the activation time is an activation time after the position where the energy saving signal is detected; and/or if the terminal is in a disconnected state, the position where the energy saving signal is detected is within the activation time.

Optionally, the energy saving signal window is located before the activation time, and the energy saving signal window includes one or more candidate positions; or the energy saving signal window includes candidate positions located before the activation time, and also includes candidate positions located within the activation time; or the energy saving signal window is within the activation time, and the energy saving signal window includes one or more candidate positions.

Optionally, the memory uses a low-power transmitter to send the energy saving signal.

Optionally, the time intervals between a plurality of candidate positions included in the energy saving signal window are equal; or the candidate positions in the energy saving signal window are determined according to prior information of the network side device; or the candidate positions in the energy saving signal window are configured on demand.

Optionally, if the candidate positions in the energy saving signal window are configured on demand, an interval between the candidate position for transmitting the energy saving signal and the PDCCH is 0, or the interval between the candidate position for transmitting the energy saving signal and the PDCCH does not exceed a preset value.

Optionally, the energy saving signal includes a first signal subset and a second signal subset, and the first signal subset is located before the second signal sub set.

Optionally, an interval between a location of the second signal subset and the PDCCH is 0, or the interval between the location of the second signal subset and the PDCCH does not exceed a preset value.

Optionally, the network side device configures configuration information of the energy saving signal window for the terminal in a semi-static, static, or dynamic manner.

It should be noted that the above-mentioned network side device in this embodiment may be a network side device in any implementation in the method embodiment of the present disclosure, and any implementation of the network side device in the method embodiment of the disclosure may be implemented by the above-mentioned network side device in this embodiment and achieves the same beneficial effects, which will not be repeated here.

The embodiment of the present disclosure also provides a computer-readable storage medium on which a computer program is stored, where the program is executed by a processor to implement the steps in the PDCCH monitoring method on the terminal side provided by the embodiment of the present disclosure, or the steps in the PDCCH monitoring method on the network side device side provided in the embodiments of the present disclosure.

In the several embodiments provided in this disclosure, it should be understood that the disclosed method and device can be implemented in other ways. For example, the device embodiments described above are merely illustrative. For example, the division of the units is only a logical function division, and there may be other divisions in actual implementation, for example, a plurality of units or components may be combined or can be integrated into another system, or some features can be ignored or not implemented. In addition, the discussed mutual coupling or direct coupling or communication connection may be indirect coupling or communication connection through some interfaces, devices or units, and may be in electrical, mechanical or other forms.

In addition, the functional units in the various embodiments of the present disclosure may be integrated into one processing unit, or each unit may be separately physically included, or two or more units may be integrated into one unit. The above-mentioned integrated unit can be realized in the form of hardware, or in the form of hardware and software functional unit.

The aforementioned integrated unit implemented in the form of a software functional unit may be stored in a computer readable storage medium. The above-mentioned software functional unit is stored in a storage medium and includes several instructions to make a computer device (which may be a personal computer, a server, or a network device, etc.) to execute a part of steps of the information data block processing method described in the various embodiments of the present disclosure. The aforementioned storage media include: a U disk, a mobile hard disk, a read-only memory (ROM), a random access memory (RAM), a magnetic disk or an optical disk, etc., which can store program code.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Physical Downlink Control Channel (PDCCH) blind detection method, comprising:

detecting, by a terminal, an energy saving signal in an energy saving signal window;

blindly detecting, by the terminal, the PDCCH within a target time if the energy saving signal is detected, wherein a distance between the target time and a position where the energy saving signal is detected is within a preset time distance range, the target time is an activation time of Discontinuous Reception (DRX);

the energy saving signal window is located before the activation time, and the energy saving signal window includes one or more candidate positions; or the energy saving signal window includes candidate positions located before the activation time, and further includes candidate positions located within the activation time.

2. The method according to claim 1, wherein, the activation time is configured by a network side device, and the position where the energy saving signal is detected is within the activation time; or the activation time is an activation time configured by the network side device and after the position where the energy saving signal is detected.

3. The method according to claim 2, wherein if the terminal is in a connected state, the position where the energy saving signal is detected is within the activation time, or the activation time is the activation time after the position where the energy saving signal is detected; and/or if the terminal is in a disconnected state, the position where the energy saving signal is detected is within the activation time.

4. The method according to claim 1, wherein the terminal uses a low-power receiver to detect the energy saving signal at a candidate position of the energy saving signal; or the terminal adopts a passive receiver to detect the energy saving signal, wherein a position for detecting the energy saving signal at least includes a position where the energy saving signal window is located.

5. The method according to claim 1, wherein time intervals between a plurality of candidate positions included in the energy saving signal window are equal; or the candidate positions in the energy saving signal window are determined according to prior information of an end for transmitting the energy saving signal; or the candidate positions in the energy saving signal window are configured on demand.

6. The method according to claim 5, wherein if the candidate positions in the energy saving signal window are configured on demand, an interval between the candidate position for transmitting the energy saving signal and the PDCCH is 0, or the interval between the candidate position for transmitting the energy saving signal and the PDCCH does not exceed a preset value.

7. The method according to claim 1, wherein the energy saving signal includes a first signal subset and a second signal subset, and the first signal subset is located before the second signal subset.

8. The method according to claim 7, wherein an interval between a location where the second signal subset is located and the PDCCH is 0, or the interval between the location where the second signal subset is located and the PDCCH does not exceed a preset value.

9. The method according to claim 7, wherein, if the energy saving signal is detected, blindly detecting, by the terminal, the PDCCH within the activation time of DRX, comprising:

if the first signal subset is detected, waking up, by the terminal, a receiver of the terminal;

if the second signal subset is detected, blindly detecting, by the terminal, the PDCCH within the activation time of DRX.

10. A PDCCH monitoring method, comprising:
transmitting, by a network side device, an energy saving signal within an energy saving signal window, so that if the terminal has detected the energy saving signal, a PDCCH is blindly detected within a target time, wherein a distance between the target time and a position where the energy saving signal is detected is within a preset time distance range, the target time is an activation time of DRX;
wherein the energy saving signal window is located before the activation time, and the energy saving signal window includes one or more candidate positions; or
the energy saving signal window includes candidate positions located before the activation time, and further includes candidate positions located within the activation time.

11. The method according to claim 10, wherein
the activation time is configured by the network side device, and the position where the energy saving signal is detected is within the activation time; or
the activation time is an activation time configured by the network side device and after the position where the energy saving signal is detected.

12. The method according to claim 11, wherein if the terminal is in a connected state, the position where the energy saving signal is detected is within the activation time, or the activation time is the activation time after the position where the energy saving signal is detected; and/or
if the terminal is in a disconnected state, the position where the energy saving signal is detected is within the activation time.

13. The method according to claim 10, wherein the network side device uses a low-power transmitter to transmit the energy saving signal.

14. The method according to claim 10, wherein the time intervals between a plurality of candidate positions included in the energy saving signal window are equal; or
the candidate positions in the energy saving signal window are determined according to prior information of the network side device; or
the candidate positions in the energy saving signal window are configured on demand.

15. The method according to claim 14, wherein if the candidate positions in the energy saving signal window are configured on demand, an interval between the candidate position for transmitting the energy saving signal and the PDCCH is 0, or the interval between the candidate position for transmitting the energy saving signal and the PDCCH does not exceed a preset value.

16. The method according to claim 10, wherein the energy saving signal includes a first signal subset and a second signal subset, and the first signal subset is located before the second signal subset.

17. The method according to claim 16, wherein an interval between a location where the second signal subset is located and the PDCCH is 0, or the interval between the location where the second signal subset is located and the PDCCH does not exceed a preset value.

18. A terminal, comprising: a transceiver, a memory, a processor, and a program stored in the memory and executed by the processor, wherein:
the processor is configured to detect an energy saving signal in an energy saving signal window; and
if the energy saving signal is detected, the PDCCH is blindly detected within a target time, wherein a distance between the target time and a position where the energy saving signal is detected is within a preset time distance range, the target time is an activation time of DRX;
wherein the energy saving signal window is located before the activation time, and the energy saving signal window includes one or more candidate positions; or
the energy saving signal window includes candidate positions located before the activation time, and further includes candidate positions located within the activation time.

19. A network side device, comprising: a transceiver, a memory, a processor, and a program stored on the memory and executed by the processor, wherein:
the processor is configured to implement the PDCCH monitoring method according to claim 10.

20. A non-transitory computer-readable storage medium with a computer program stored thereon, wherein the computer program is executed by a processor to implement the steps in the PDCCH monitoring method according to claim 1.

* * * * *